United States Patent
Chen et al.

(10) Patent No.: US 10,084,635 B2
(45) Date of Patent: Sep. 25, 2018

(54) HIGH EFFICIENCY SIGNAL FIELD CODING

(71) Applicant: Intel IP Corporation, Santa Clara, CA (US)

(72) Inventors: Xiaogang Chen, Beijing (CN); Qinghua Li, San Ramon, CA (US); Yuan Zhu, Beijing (CN); Hujun Yin, Saratoga, CA (US)

(73) Assignee: Intel IP Corporation, Santa Clara, CA (US)

( * ) Notice: Subject to any disclaimer, the term of this patent is extended or adjusted under 35 U.S.C. 154(b) by 137 days.

(21) Appl. No.: 14/979,266

(22) Filed: Dec. 22, 2015

(65) Prior Publication Data

US 2017/0013506 A1    Jan. 12, 2017

Related U.S. Application Data

(60) Provisional application No. 62/189,421, filed on Jul. 7, 2015.

(51) Int. Cl.
| | |
|---|---|
| *H04W 4/00* | (2018.01) |
| *H04L 29/06* | (2006.01) |
| *H04L 1/00* | (2006.01) |
| *H04L 1/08* | (2006.01) |
| *H04W 84/12* | (2009.01) |

(52) U.S. Cl.
CPC ............ *H04L 29/0653* (2013.01); *H04L 1/00* (2013.01); *H04L 1/0057* (2013.01); *H04L 1/0061* (2013.01); *H04L 1/0072* (2013.01); *H04L 1/08* (2013.01); *H04W 84/12* (2013.01)

(58) Field of Classification Search
USPC ................................................. 370/329, 338
See application file for complete search history.

(56) References Cited

U.S. PATENT DOCUMENTS

| | | | | |
|---|---|---|---|---|
| 2016/0112157 A1* | 4/2016 | Li | ........................ | G06F 11/1004 714/807 |
| 2016/0204915 A1* | 7/2016 | Chen | ..................... | H04L 1/0061 370/329 |
| 2016/0262157 A1* | 9/2016 | Kim | ...................... | H04B 7/0413 |
| 2016/0366666 A1* | 12/2016 | Yang | .................... | H04W 72/042 |

* cited by examiner

*Primary Examiner* — Phuongchau Ba Nguyen
(74) *Attorney, Agent, or Firm* — Eversheds Sutherland (US) LLP

(57) ABSTRACT

This disclosure describes methods, apparatus, and systems related to a high efficiency signal field coding system. A device may determine a high efficiency preamble in accordance with a high efficiency communication standard to be sent to one or more devices, the high efficiency preamble including at least in part a high efficiency signal field. The device may determine a common part included in the high efficiency signal field. The device may determine one or more device specific parts associated with the one or more devices. The device may encode the high efficiency signal field based at least in part on a predetermination combination of at least one of the common part or the one or more device specific parts. The device may cause to send the high efficiency preamble to the one or more devices, including the encoded high efficiency signal field.

20 Claims, 8 Drawing Sheets

FIGs. 3A-C

HIGH EFFICIENCY SIGNAL FIELD CODING

CROSS-REFERENCE TO RELATED APPLICATIONS

This application claims the benefit of U.S. Provisional Application No. 62/189,421 filed Jul. 7, 2015 the disclosure of which is incorporated herein by reference as if set forth in full.

TECHNICAL FIELD

This disclosure generally relates to systems and methods for wireless communications and, more particularly, high efficiency SIGNAL field coding in wireless communications.

BACKGROUND

Wireless devices are becoming widely prevalent and are increasingly requesting access to wireless channels. A next generation WLAN, IEEE 802.11ax or High-Efficiency WLAN (HEW), is under development. HEW utilizes Orthogonal Frequency-Division Multiple Access (OFDMA) in channel allocation.

DETAILED DESCRIPTION

Figure 1:
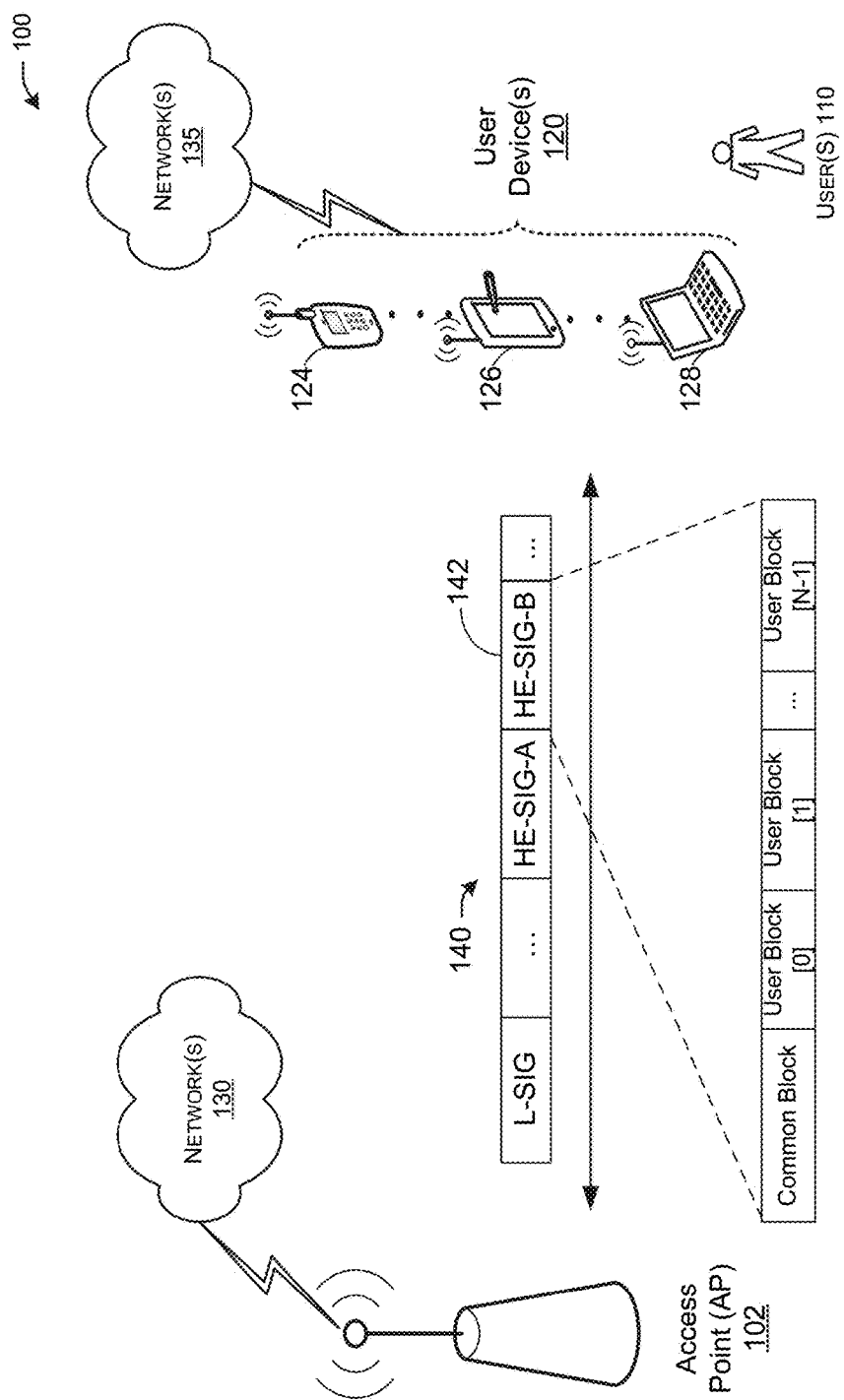
FIG. 1 depicts a network diagram illustrating an example network environment of an illustrative high efficiency signal field coding system, according to one or more example embodiments of the disclosure.

Example embodiments described herein provide certain systems, methods, and devices, for providing signaling information to Wi-Fi devices in various Wi-Fi networks, including, but not limited to, IEEE 802.11ax (referred to as HE or HEW).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields (or symbols) that may be based on communications standards, such as IEEE 802.11 standards, including IEEE 802.11ax. In a high efficiency communication (e.g., HEW) these one or more fields may be represented by one or more OFDMA symbols. The one or more fields may include some legacy signal fields and some high efficiency signal fields. One of the high efficiency signal fields is referred to as HE-SIG-B. The HE-SIG-B field may describe attributes of the one or more frames, such as, the channel width, modulation and coding, and whether the frame is a single- or multi-user frame. The HE-SIG-B field may be split into one or more parts. The one or more parts may contain a common part and one or more user specific parts. It is understood that a user specific part refers to a device specific part. For example, the common part may be common to all devices and the user specific parts may be specific to each device receiving at least one of the one or more frames. The common part includes information for all users in the current PLCP protocol data unit (PPDU), and the user specific part includes the specific information for each specific user. It is understood that PLCP stands for physical layer convergence protocol.

Example embodiments of the present disclosure relate to systems, methods, and devices for high efficiency signal field coding system that facilitate grouping of one or more parts of a high efficiency signal field (e.g., HE-SIG-B) in order to generate one or more codewords. Grouping the one or more parts during the encoding process may optimize, for example, the HE-SIG-B coding scheme. It is understood that a codeword, may be defined as a code defining the encoding of one or more of the above parts (e.g., user specific parts and/or common part of HE-SIG-B). Encoding is the process of converting information into a particular form or putting a sequence of characters into a special format for transmission or storage purposes. It is understood that decoding is the opposite process—the conversion of an encoded format back into the original sequence of characters.

For example, one or more of user specific parts of the HE-SIG-B field may be coded individually or jointly with each other parts. Additionally/alternatively, one or more user specific parts may be coded together with a common part of the HE-SIG-B field. The generated codeword may then be prepared for transmission to a device that may receive the symbols representing these codewords.

In another example, a number of user specific parts may be grouped together for encoding, where a cyclic redundancy check (CRC) may be added to each of the user specific parts before encoding. It is understood that a CRC is an error-detecting code commonly used in digital networks and storage devices to detect accidental changes to raw data. Blocks of data entering these systems get a short check value attached, based on the remainder of a polynomial division of their contents. It should also be understood that tail bits may be added to the codewords. It should be understood that tail bits may be non-informational fixed sequence of bits added to the end of a block of data to reset an encoder to a predefined state.

FIG. 1 is a network diagram illustrating an example network environment, according to some example embodiments of the present disclosure. Wireless network 100 may include one or more devices 120 and one or more access point(s) (AP) 102, which may communicate in accordance with IEEE 802.11 communication standards, including IEEE 802.11ax. The device(s) 120 may be mobile devices that are non-stationary and do not have fixed locations.

Figure 6:
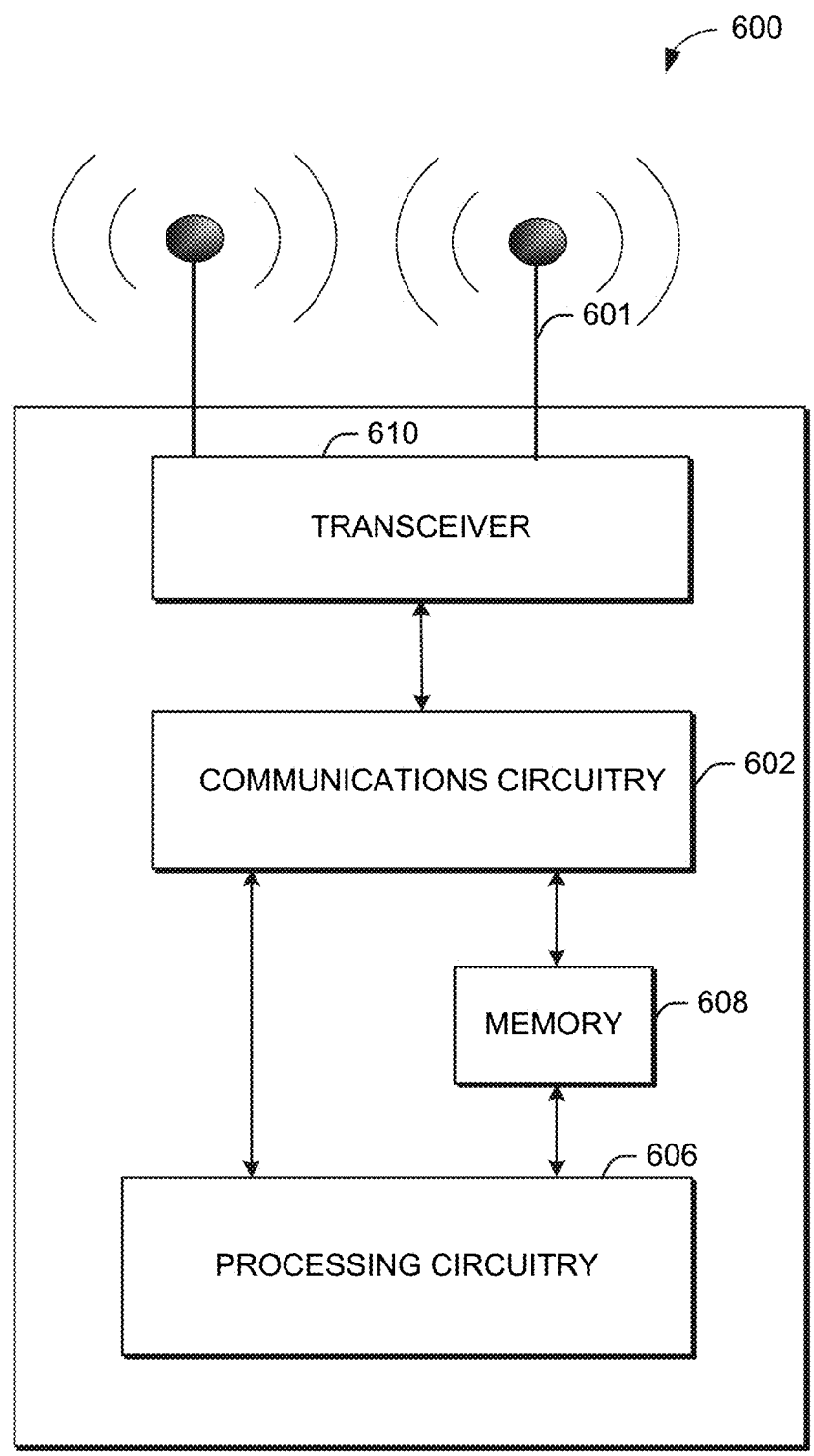
FIG. 6 illustrates a functional diagram of an example communication station that may be suitable for use as a user device, in accordance with one or more example embodiments of the disclosure.
Figure 7:
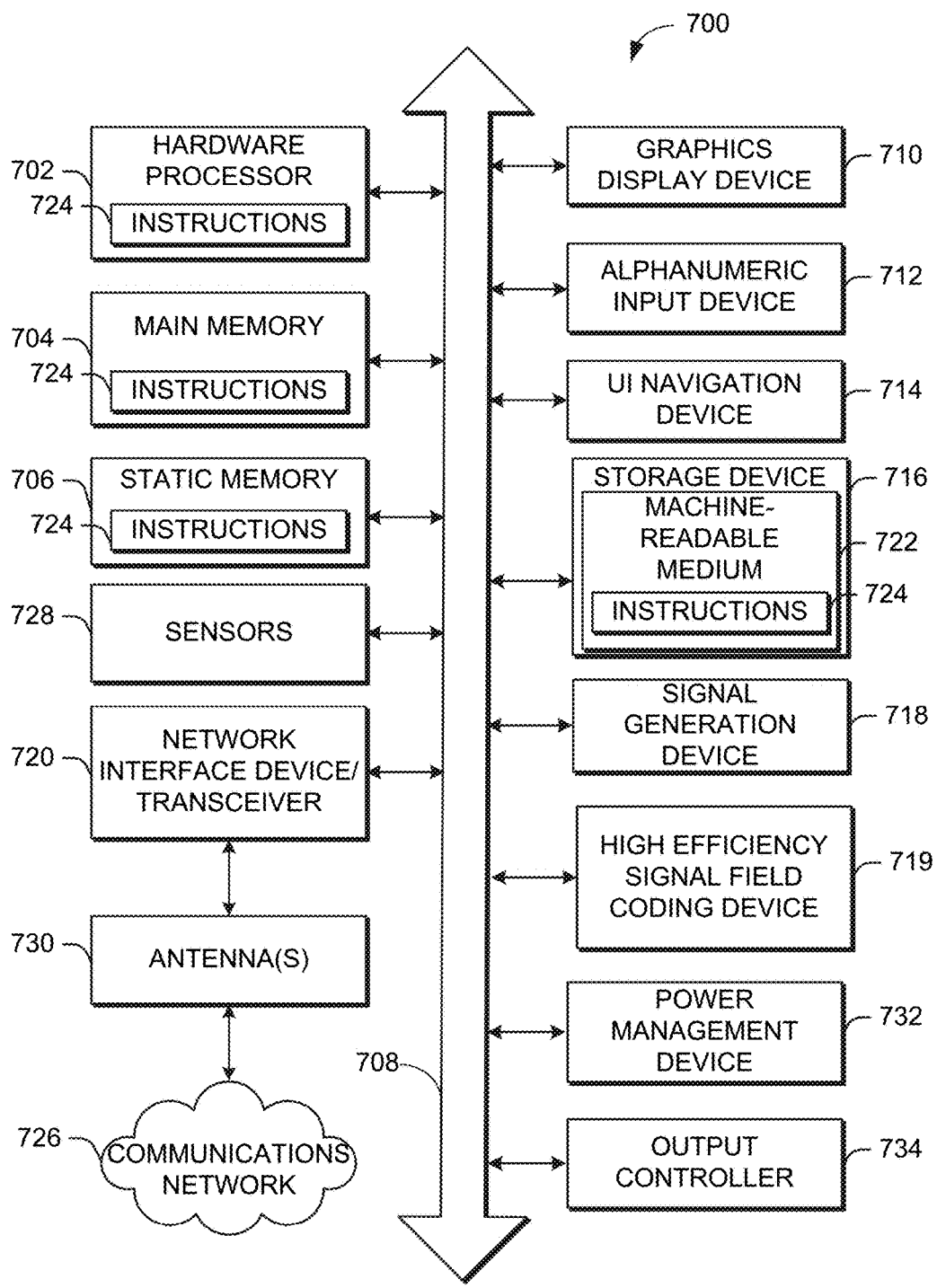
FIG. 7 is a block diagram of an example machine upon which any of one or more techniques (e.g., methods) may be performed, in accordance with one or more embodiments of the disclosure.

In some embodiments, the user devices 120 and AP 102 may include one or more computer systems similar to that of the functional diagram of FIG. 6 and/or the example machine/system of FIG. 7.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth.

Any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennae. Communications antenna may be any suitable type of antenna corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 120.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 102) establishes communication with one or more user devices 120 (e.g., user devices 124, 126, and/or 128), the AP may communicate in the downlink direction by sending data frames. The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

In one embodiment, and with reference to FIG. 1, an HEW preamble (e.g., preamble 140) may include one or more fields, such as, a legacy signal field (L-SIG), a high efficiency signal field A (HE-SIG-A) and high efficiency signal field B (HE-SIG-B) 142. It is understood that the above acronyms may be different and not to be construed as a limitation as other acronyms may be used for the fields included in an HEW preamble.

During a communication session between AP 102 and one or more user devices 120 on a communications channel, a transmitting device (e.g., AP 102 and/or user devices 120) may send one or more data fields. These data fields may include at least in part the HE-SIG-B 142 field. The HE-SIG-B field will be used throughout the disclosure; however, other fields within preamble 140 may also utilize the techniques provided below. The HE-SIG-B 142 field may be composed of one or more subfields. For example, HE-SIG-B 142 may include, at least in part, a common part and one or more user specific parts. The common part may include, at least in part, common bits, joint resource signaling (including multi-user multiple-input and multiple-output (MU-MIMO) information, and other common data that may be common to all the users (e.g., user devices 120) that AP 102 may communicate with. If there are N users in the current PPDU, the HE-SIG-B may contain one common part and may contain N user parts, where N is an integer that represents the number of user devices that may be serviced by AP 102. In order for HE-SIG-B to be transmitted from one device to another (e.g., from AP 102 to user device 120 or vice versa), one or more encoding processes may encode HE-SIG-B into a plurality of codewords that may be prepared for transmission over the communications channel.

Figure 2:
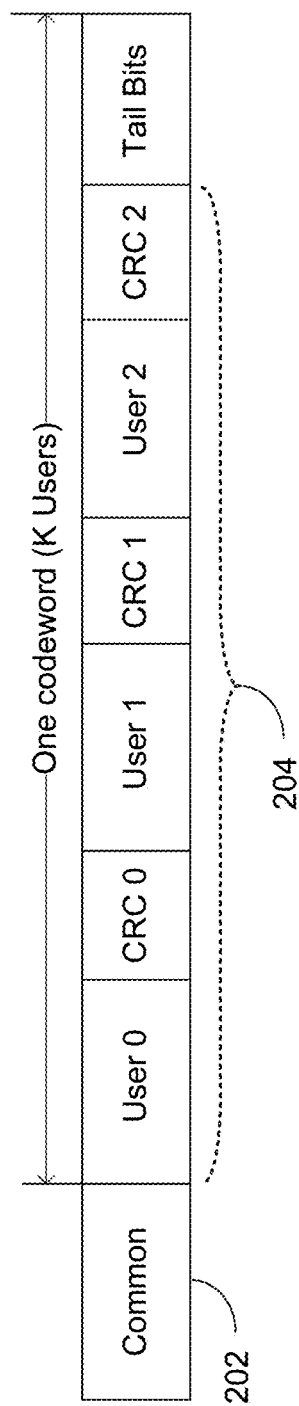
FIG. 2 depicts an illustrative schematic diagram of a high efficiency signal field, in accordance with one or more example embodiments of the present disclosure.

FIG. 2 depicts an illustrative schematic diagram of a high-efficiency signal field (e.g., HE-SIG-B), in accordance with one or more example embodiments of the present disclosure.

Referring to FIG. 2, there is shown an example of a HE-SIG-B field including a common part 202 and K number of user specific parts, where K refers to number of users in a codeword. In this example, three user blocks (e.g., K=3, where K is the number of users that may be grouped together) are grouped together while the common part is by itself.

In one embodiment, before an HEW preamble is sent from an AP (e.g., AP 102 of FIG. 1) to one or more user devices (e.g., user device 120 of FIG. 1), that may be serviced by the AP, the fields included in the HEW preamble may be encoded before transmission. For example, the HE-SIG-B field may contain at least in part a common part 202 and user specific parts 204. The common part 202 and the user specific parts may be encoded by the one or more encoding processes. These user specific parts 204, 206, and 208 (for User 0, User 1, and User 2 respectively) may be grouped together for encoding using one or more encoding processes. The common part (e.g., common part 202) may encoded by itself. In addition to grouping the user specific parts together, each user specific part may be followed by an individual cyclic redundancy check (CRC). In that sense, one codeword of an encoded HE-SIG-B, may include a number of user specific parts (e.g., User 0, User 1, and User 2), where each user specific block is followed by a CRC (e.g., CRC 0, CRC 1, CRC 2), respectively, and another codeword may represent the encoded common part.

Having each user specific part followed by its own CRC may result in the information for each user to be validated individually. This may increase the reliability in case there is a decoding error. The decoding error may affect part of the codeword with K users but not all the users within the codeword. Namely, one user may not be impacted even if another user was decoded in error. This scheme may improve the performance of HE-SIG-B decoding. Simulation results show that the performance of the scheme approaches to that of individually encoding each user block. It is understood that the above is one technique of grouping user blocks and CRCs, and that other grouping techniques may be employed when encoding a high-efficiency fields such as HE-SIG-B. Further, although HE-SIG-B is used in the above example, other high-efficiency fields of an HEW preamble may employ such encoding techniques.

Figure 3:
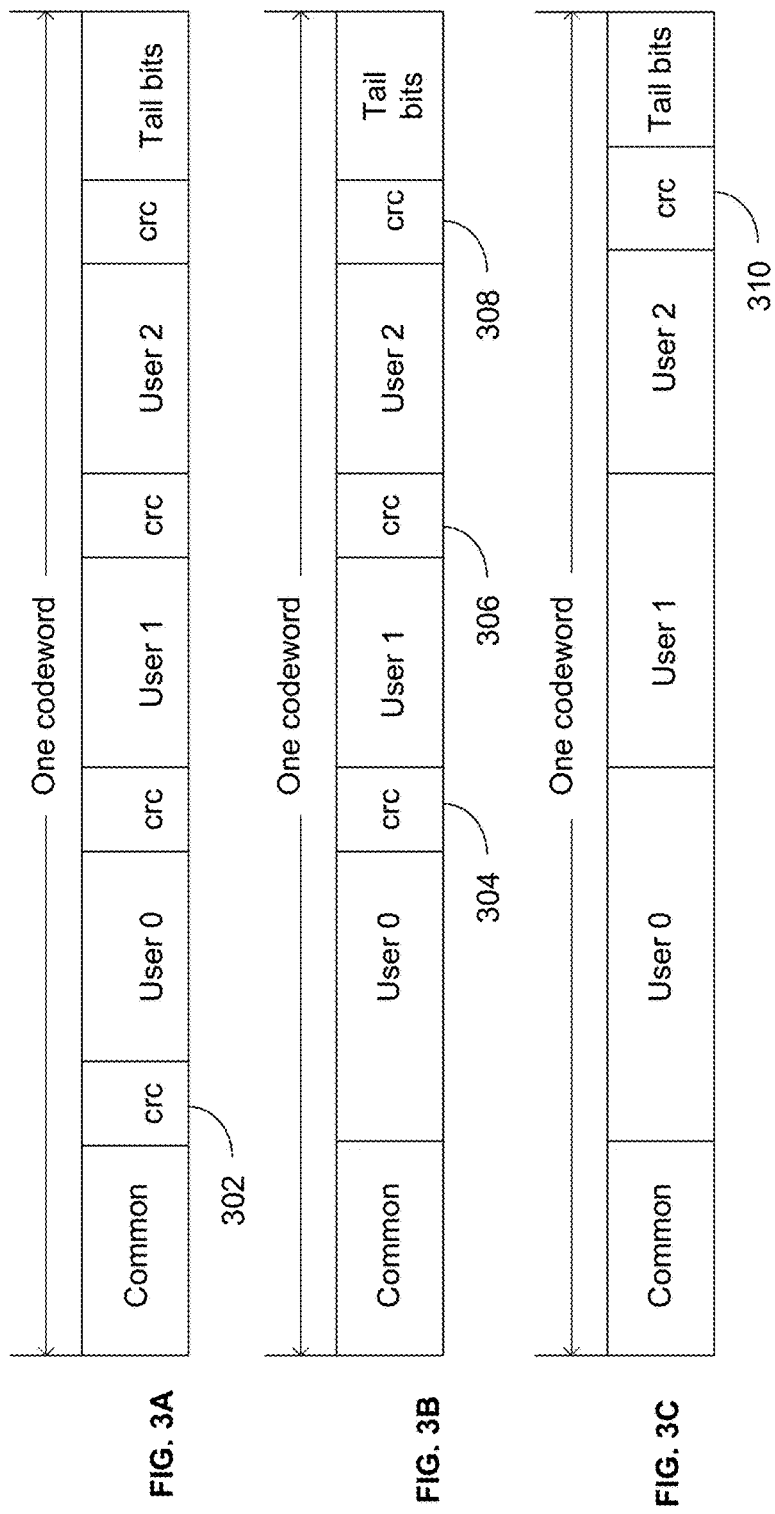
FIGS. 3A-C depict illustrative schematic diagrams of a high efficiency signal field, in accordance with one or more example embodiments of the present disclosure.

FIG. 3 depicts an illustrative schematic diagram of high-efficiency signal field (e.g., HE-SIG-B), in accordance with one or more example embodiments of the present disclosure. Referring to FIG. 3, there is shown various combinations of a codeword of an encoded HE-SIG-B field. In one embodiment, one or more combination of a number of users in one codeword may be used.

In one embodiment, a high efficiency signal field coding system may encode the common part of HE-SIG-B with the first user specific part(s). Since the common part has a very limited number of information bits (e.g., 8 bits for 20 MHz), it may improve the efficiency, for example, by saving the overhead of CRC and tail bits if the common part is encoded together with a user specific part.

As can be seen in FIG. 3, three options for encoding a codeword of a high efficiency field (e.g., HE-SIG-B) are presented. However, it should be appreciated that other options depicting the combination of user specific parts combination with other parts in an encoded high-efficiency fields such as HE-SIG-B. In addition, the technique for encoding the high-efficiency field may be applied to other fields within the HEW preamble and not limited to high-efficiency fields.

FIG. 3A, shows a codeword of HE-SIG-B having one common part and three user specific parts (e.g., User specific parts User 0, User 1, User 2). In this example, the common part may be encoded together with all the user specific parts of the codeword. That is, the common part may be encoded with User 0, User 1, User 2 user specific parts. The common part may have its own CRC 302, and the user specific parts may have their own CRCs.

FIG. 3B, a codeword may include the common part and a K users; K is the number of users per codeword. The common part may be combined with the first M users of the K users, which may share the same CRC. For example, if M=1, the common part may be grouped with the first user (e.g., User 0). Further, the common part and User 0 may share one CRC 304, while the other user specific parts (e.g., user specific parts User 1 and User 2) may have their own CRCs (e.g., CRCs 306 and 308). It is understood that tail bits may be used at the end of the codeword.

In FIG. 3C, the common part may be encoded together with the first M users and may share one CRC with all of the M users. For example, if M=3, the common part may be combined with User 0, User 1, User 3 sharing one CRC 310 to form an encoded codeword. It is understood that tail bits may be used at the end of the codeword. It should be also noted that M and K may be the same or different.

In one embodiment, when the total number of users, N, is less than the number of users M that may be combined with the common block, the first codeword may not be filled up and may generates some overhead. First, the high efficiency signal field coding system may indicate the number of users in the common part (e.g., M users). After decoding the first codeword with the common part, the receiving device (e.g., user device(s) 120 and/or AP 102 of FIG. 1) may know the total number of users for the subband or subchannel or the entire band. This is the case because since the total number of users is less than the number of users that are combined with the common part, one codeword would be sufficient to deduce the N value. For example, if the total number of users is N=1 and the number of user specific parts to be combined with the common part was determined to be M=3. The first codeword may include the common part and allocate space for three user specific parts. However, since the total number of users is N=1, then only one user specific part may be used and the other two user specific parts may contain other information. After the receiving device decodes this first codeword, the receiving device may determine that the total number of user is N=1 since only one user specific part was present in the received codeword.

In one embodiment, padding may be used for any allocated user specific part that is not used because the total number of users N is less than the number of users M to be combined with the common part. The user specific for the M users may still be grouped together for the ease of implementation. However, not every slot is filled with a user specific part since N<M. Because N<M, padding may be applied to the remaining M-N user specific parts before encoding. The padding may be dummy bits such as zeros. Alternatively, some of the N user specific parts may be repeated in order to act as padding is. For example, the first M-N user specific parts may be repeated as padding to form a codeword that may accommodate M user specific parts. The receiver device (e.g., user device 120) may make use of the repetition to enhance the decoding. For example, the receiver device may obtain two decoded copies of the same user specific part and may select the one passing the CRC.

In one embodiment, the common part may be encoded individually. The N user specific parts may be jointly encoded. For example, if the M=3 and N=2, the common part may be encode individually, while the two users specific parts may be encoded together.

In one embodiment, the common part may be encoded with the first user specific part. The remaining N−1 user specific parts may be jointly encoded. For example, if M=4 and N=3, the common part may be encoded with the first user part (e.g., User 0) and the rest of the user specific parts (e.g., for User 1 and User 2) may be jointly encoded.

In one embodiment, the common part may be encoded with the first user specific part. The remaining N−1 user specific parts and padding bits may be jointly encoded. Since N<M, there will be one or more blocks that having padding applied. As shown above, the padding may take the form or dummy bits or may be a repeated user specific block. For example, if M=3 and N=2, the common part may be encoded with the first user specific part (e.g., with User 0). Since M=3 and N=2, then there may be one padding block. This padding block may be combined with User 1.

In some embodiments, for each of the above options, the receiving device has to be aware of which option was adopted by the transmitter. For example, the transmitting device (e.g., AP 102 and/or user devices 120 of FIG. 1) may notify the receiving device (e.g., AP 102 and/or user devices 120 of FIG. 1) of the codeword combination that was adopted. The notification may be done in various ways, for example, notifying the receiving device by explicitly using the HE-SIG-A to let the receiving device know which combination is used in one codeword. There are other ways to notify the receiving device of the makeup of a codeword of an encoded HE-SIG-B, such as signaling that information in the common part of HE-SIG-B or defining the makeup of the codeword of an encoded HE-SIG-B field in a communications standard (e.g. IEEE 802.11ax). Depending on the number of users in the current PPDU and/or the signal-to-interference-plus-noise ratio (SINR) situation of the channels, the number of K users may be different. One or two bits may be used to signal different number of K. For example, one or more bits may be set to indicate that K=2, 4, or K=2, 4, 6, 8, etc. For example, the bit may be a bit in high-efficiency or legacy fields that may be used to set the K value such that a receiving device decoding that one or more bits may determine what the K value is. In that case, the receiving device may utilize that information in order to perform correct decoding of a received field.

Figure 4:
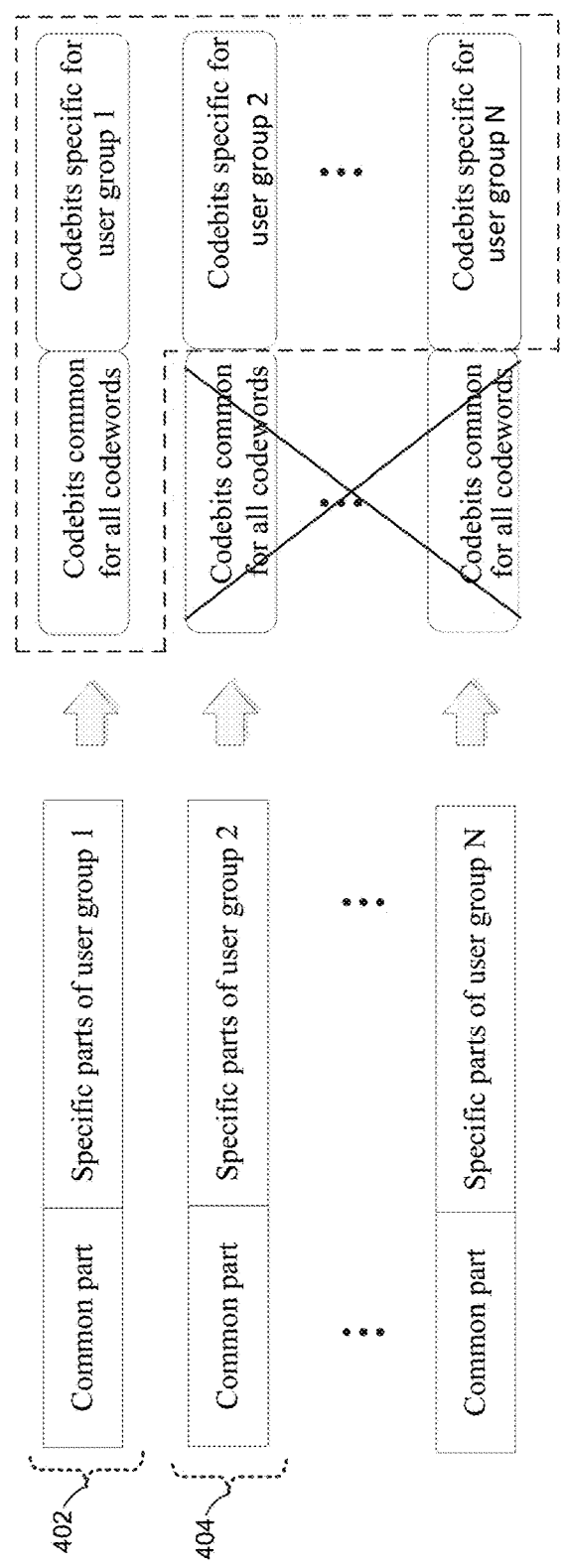
FIG. 4 depicts an illustrative schematic diagram of cascade encoding of a common part and one or more user groups, in accordance with one or more example embodiments of the present disclosure.

FIG. 4 depicts an illustrative schematic diagram of cascade encoding of a common part and one or more user groups, in accordance with one or more example embodiments of the present disclosure.

In one embodiment, the common part and each group of K user specific parts may be encoded together. The codebits corresponding to the common part may be sent once, as opposed to sending these codebits for every group of K user specific parts. For example, if the total number of users that may be serviced by an AP is equal to 9, and the number of K user specific parts that may be grouped together with the common part is equal to 3, there may be 3 codewords that may include codebits for the encoded user specific parts and their corresponding common part. That is, the first codeword may the common part combined with the corresponding user specific parts of user group 1 (e.g., first three users because K=3), where group 1 includes user specific parts 0, 1, and 2. The second codeword may include the common part combined with the corresponding user specific parts of user group 2, where group 2 includes user specific parts 3, 4, and 5. The third codeword may include the common part combined with the corresponding user specific parts 6, 7, and 8. The size of each user group may be the same (e.g., K=3) or may be different. That is, group 1 may have a K value of 3, but the K value of group 2 may be equal to 4 or other values. It is understood that the above are only examples and that other K values may be used. It is also understood that each codeword may have CRC and/or tail bits.

In one embodiment, codebits that may be common to the codewords may be omitted when sending the codebits to the receiving device in case convolutional encoding is used. For example, applying convolutional encoding in order to encode each grouping of common parts and user specific parts may result in one or more codebits for each group. The one or more codebits may contain codebits that are common between each grouping of common part and user specific parts. For example, if there are two groupings of common part and corresponding user specific parts (e.g., grouping 402 and grouping 404), each bit of the common part and the user specific parts may pass through a convolutional encoder to generate a series of codebits. After all, bits belonging to the common parts and the user specific parts for the two groupings 402 and 404 pass through the convolutional encoder, the series of codebits may contain codebits that may be common to both groupings. This is true because parts of the common part of grouping 402 and the common part of grouping 404 may be the same.

It should be noted that convolutional encoding is commonly specified by three parameters, number of input bits, number of output bits, and number of memory registers. The output bits are typically produced by adding certain bits in the memory registers. The selection of which bits are to be added to produce the output bits is determined by a polynomial. For each input bit, there are three output bits. For example, an input bit from the common part of grouping 402 may generate three output bits. For example, the first output bit may have a polynomial of (1, 1, 1). The second output bit may have a polynomial of (0, 1, 1) and the third output bit may have a polynomial of (1, 0, 1). Performing the same for grouping 404 may also generate the same codebits when the common parts pass through the convolutional encoder. In order to efficiently send the codebits to the receiving device, the same codebits that are common between groupings 402 and 404, may be sent only once, as opposed to twice. It should be noted that although an example of two groupings 402 and 404 is given, multiple groupings may be encoded using a convolutional encoder that may generate common codebits between the groupings that may be sent only once with the first series of codebits.

Figure 5A:
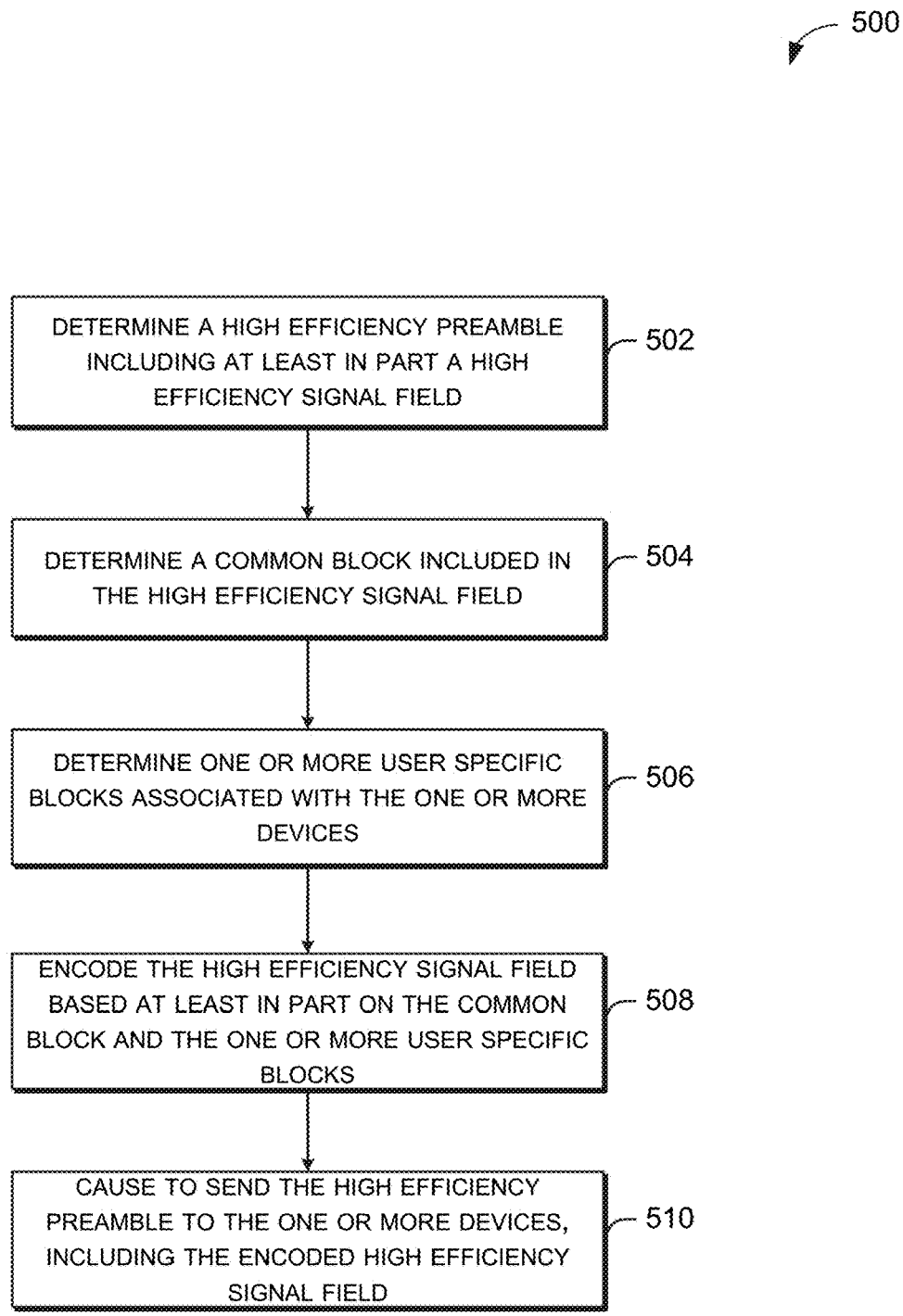
FIGS. 5A-5B depict flow diagrams of illustrative processes for an illustrative high efficiency signal field coding system, in accordance with one or more embodiments of the disclosure.

FIG. 5A illustrates a flow diagram of illustrative process 500 for a high efficiency signal field coding system in accordance with one or more embodiments of the disclosure.

At block 502, a device (e.g., AP 102 and/or user devices 120 of FIG. 1) may determine a high efficiency preamble in accordance with a high efficiency communication standard to be sent to one or more devices, the high efficiency preamble including at least in part a high efficiency signal field. The high efficiency signal field includes a high efficiency signal B (HE-SIG-B) field.

At block 504, the device may determine a common part included in the high efficiency signal field (e.g., HE-SIG-B). The common part comprises common information to the one or more devices. The common part may include, at least in part, common bits, joint resource signaling (including multi-user multiple-input and multiple-output (MU-MIMO) information, and other common data that may be common to all the users.

At block 506, the device may determine one or more user specific parts associated with the one or more devices. For example, HE-SIG-B may contain a common part and one or more user specific parts. User specific parts may be information related to each of the devices that the transmitting device is communicating with. For example, if an AP is communicating with one or more user devices, the HE-SIG-B of a transmission from the AP to be one or more user devices may include common information to all the user devices and may also include user specific information for each of the one or more user devices.

At block 508, the device may encode the high efficiency signal field (e.g., HE-SIG-B) based at least in part on the common part and the one or more user specific parts. For example, the high efficiency signal field coding system may group the common part with a cyclic redundancy check (CRC) and group each user specific part of the one or more user specific parts of the HE-SIG-B with its own CRC. This formation may be then encoded into one codeword. For example, if the high efficiency signal field coding system determines that a codeword has three user specific parts and a common part, the high efficiency signal field coding system may group the common part with a CRC and the first user specific part with a first CRC, the second user specific part with a second CRC, and the third user specific part with a third CRC. It is understood that the above is only one scenario grouping the common part of the HE-SIG-B field and the one or more user specific parts. Other scenarios may include grouping the common part and the first user specific part with a first CRC, then grouping each user specific part with its own CRC. In a further example, the high efficiency signal field coding system may group the common part with each of the user specific parts within a codeword using only one CRC. After the codeword is generated, the encoder may continue encoding the other fields within the high efficiency preamble.

At block 510, the device may send the high efficiency preamble to other devices (e.g., AP 102 and/or user devices 120 of FIG. 1), where the high efficiency preamble includes the encoded HE-SIG-B.

Figure 5B:
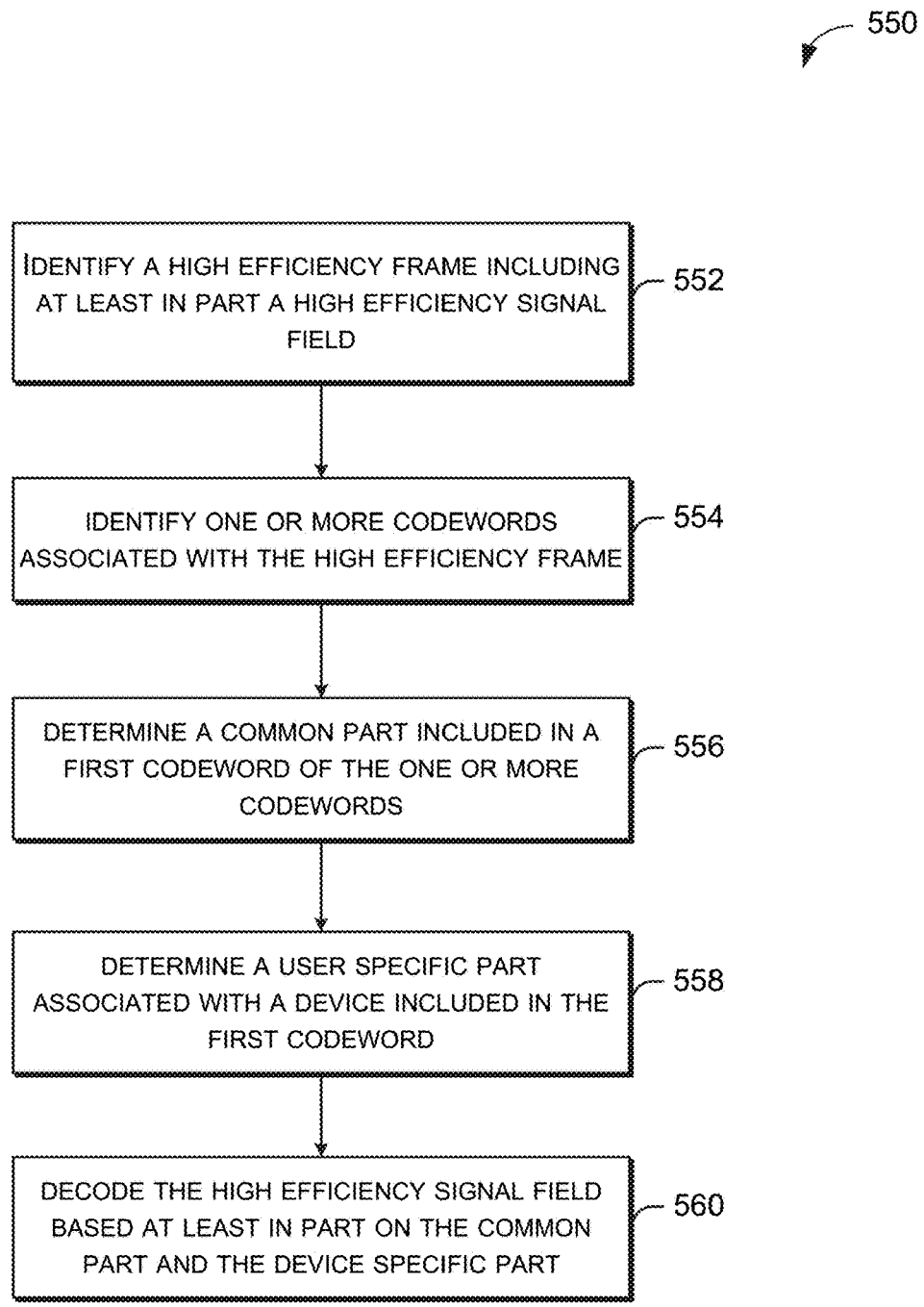

FIG. 5B illustrates a flow diagram of illustrative process 550 for a high efficiency signal field coding system in accordance with one or more embodiments of the disclosure.

At block 552, when a device (e.g., user devices 120 or AP 102 of FIG. 1) that may be a transmitting device communicates with one another device (e.g., user devices 120 or AP 102 of FIG. 1) that may be a receiving device, the devices may communicate by sending and receiving data frames that may contain one or more preambles. For example, the receiving may identify a high efficiency frame in accordance with a high efficiency communication standard (e.g., HEW). The high efficiency frame may include one or more high efficiency SIGNAL fields, including a high efficiency signal B (HE-SIG-B) field. Details of which mechanism was used by the decoder of the transmitting device for decoding the data may be exchanged with the device using one or more messages, or may be set in as part of the communications standard used by the receiving device and/or the transmitting device, or may be set by a network/system administrator.

At block 554, the device may identify one or more codewords associated with the HE-SIG-B field. For example, the data frames that may be received may be encoded data that was encoded by the transmitting device before transmission. The encoded data may be represented by one or more codewords. When the receiving device receives these codewords, the device may decode them using at least one decoding process.

At block 556, the device may determine a common part included in a first codeword. For example, when the device decodes a codeword, the device may determine that some parts of the decoded codeword may be associated with fields that were communicated in the data frame. For example, the device may determine that some of the decoded data include a common part that may be comprised of common information to all devices that may receive the high efficiency frame.

At block 558, the device may determine a user specific part associated with a device included in the first codeword. The decoded codewords may also include, in addition to the common part, at least one user specific part. The user specific part may be associated with each device receiving the data frame. This may include resource allocation or signal data associated with that device.

At block 560, the device may determine a grouping of at least one of the common part and the one or more user specific part with one or more cyclic redundancy checks (CRC), the one or more CRCs include a first CRC and a second CRC. In some examples, the grouping may have included the common part a CRD associated with the common part. Each of the one or more user specific parts may have been grouped with its respective CRC. In yet another example, the common part may have been grouped with a number of user specific parts within a received codeword. For example, if a codeword had one common part and 3 user specific parts, the encoder of the transmitting device may have grouped the common part with one user specific part within the codeword. The decoder may be aware of that mechanism employed by the encoder of the transmitting device beforehand and may use that knowledge during decoding of the received codewords.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2, 3, 4, 5A and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device may, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a high efficiency signal field coding device 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The high efficiency signal field coding device 719 may be carry out or perform any of the operations and processes (e.g., processes 500 and 550) described and shown above. For example, the high efficiency signal field coding 719 may be configured to facilitate grouping of one or more parts (e.g., common part and/or user specific parts) in order to code a high efficiency signal field (e.g., HE-SIG-B). Grouping the one or more parts may optimize, for example, the HE-SIG-B coding scheme. For example, a predetermined number of user specific parts may be coded individually or with other user specific parts. Further, a predetermined number of user specific parts may be coded with the common part before transmission to a device that may receive the symbols representing these coded words.

The high efficiency signal field coding 719 may be configured to group a predetermined number of user specific parts together for encoding and each user has an individual cyclic redundancy check (CRC). A codeword may also contain a CRC and/or a number of tail bits. It is understood that a codeword, may be defined as a code defining the encoding of one or more of the above parts (e.g., user specific parts and/or common part of HE-SIG-B).

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 500 and 550) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include at least one memory that stores computer-executable instructions, and at least one processor of the one or more processors configured to access the at least one memory, wherein the at least one processor of the one or more processors is configured to execute the computer-executable instructions to execute the computer-executable instructions to determine a high efficiency preamble in accordance with a high efficiency communication standard to be sent to one or more devices, the high efficiency preamble including at least in part a high efficiency signal field. The at least one processor of the one or more processors may be configured to execute the computer-executable instructions to determine a common part included in the high efficiency signal field. The at least one processor of the one or more processors may be configured to execute the computer-executable instructions to determine one or more device specific parts associated with the one or more devices. The at least one processor of the one or more processors may be configured to execute the computer-executable instructions to encode the high efficiency signal field based at least in part on a predetermination combination of at least one of the common part or the one or more device specific parts. The at least one processor of the one or more processors may be configured to execute the computer-executable instructions to cause to send the high efficiency preamble to the one or more devices, including the encoded high efficiency signal field.

The implementations may include one or more of the following features. The common part comprises common information to the one or more devices. The high efficiency signal field may include a high efficiency signal B (HE-SIG-B) field. The at least one processor is further configured to execute the computer-executable instructions to determine one or more codewords associated with encoding the high efficiency signal field. The one or more codewords include at least one of the common part or the one or more device specific parts. the at least one processor is further configured to execute the computer-executable instructions determine a first device specific part of the one or more device specific parts to be included in the one of the one or more codewords. The at least one processor of the one or more processors may be configured to execute the computer-executable instructions to determine a second device specific part of the one or more device specific parts to be included in the one of the one or more codewords. The at least one processor is further configured to execute the computer-executable instructions determine a first cyclic redundancy check (CRC) associated with the first device specific part. The at least one processor of the one or more processors may be configured to execute the computer-executable instructions to determine a second CRC associated with the second device specific part. The at least one processor of the one or more processors may be configured to execute the computer-executable instructions to determine a third CRC associated with the common part.

The instructions to encode the high efficiency signal field further may include computer-executable instructions to group the first device specific part and the first CRC into a first group. The at least one processor of the one or more processors may be configured to execute the computer-executable instructions to group the second device specific part and the second CRC into a second group. The at least one processor of the one or more processors may be configured to execute the computer-executable instructions to group the common part with the third CRC into a third group. The at least one processor of the one or more processors may be configured to execute the computer-executable instructions to encode the first group, the second group and the third group into a first codeword of the one or more codewords. The instructions to encode the high efficiency signal field further may include computer-executable instructions to determine a fourth CRC associated with the common part and the first device specific part. The at least one processor of the one or more processors may be configured to execute the computer-executable instructions to group the common part with the first device specific part and the fourth CRC into a first group. The at least one processor of the one or more processors may be configured to execute the computer-executable instructions to group the second device specific part with the second CRC into a second group. The at least one processor of the one or more processors may be configured to execute the computer-executable instructions to determine a CRC associated with the common part and the one or more device specific parts, group the common part with the one or more device specific parts and the CRC, and encode the common part, the one or more device specific parts and the CRC into a codeword.

The at least one processor of the one or more processors may be configured to execute the computer-executable instructions to encode the first group and the second group into a first codeword. The device may further include a transceiver configured to transmit and receive wireless signals. The device may further include an antenna coupled to the transceiver.

According to example embodiments of the disclosure, there may be a non-transitory computer-readable medium storing computer-executable instructions which, when executed by a processor, cause the processor to perform operations. The operations may include identifying a high efficiency frame in accordance with a high efficiency communication standard sent to one or more devices, the high efficiency frame including at least in part a high efficiency signal field. The operations may include identifying one or more codewords associated with the high efficiency frame. The operations may include determining a common part included in a first codeword. The operations may include determining a device specific part associated with a device included in the first codeword. The operations may include decoding the high efficiency signal field based at least in part on the common part and the device specific part.

The implementations may include one or more of the following features. The operations may include the common part comprises common information to one or more devices, the one or more devices including the device. The high efficiency signal field is a high efficiency signal B (HE-SIG-B) field. The at least one processor is further configured to execute the computer-executable instructions to determine one or more codewords associated with decoding the high efficiency signal field. At least one codeword of the one or more codewords may include at least in part grouping of the common part and the device specific part. Grouping may include at least in part, grouping a cyclic redundancy check (CRC) with the device specific part. The grouping may include at least in part, grouping a cyclic redundancy check (CRC) with the common part.

In example embodiments of the disclosure, there may be a method. The method, may include identifying a high efficiency frame in accordance with a high efficiency communication standard sent to one or more devices, the high efficiency frame including at least in part a high efficiency signal field, identifying one or more codewords associated with the high efficiency frame, determining a common part included in a first codeword, determining a device specific part associated with a device included in the first codeword, and decoding the high efficiency signal field based at least in part on the common part and the device specific part.

Implementations may include one or more of the following features. The common part comprises common information to one or more devices, the one or more devices including the device. The high efficiency signal field is a high efficiency signal B (HE-SIG-B) field. The at least one processor is further configured to execute the computer-executable instructions to determine one or more codewords associated with decoding the high efficiency signal field. At least one codeword of the one or more codewords may include at least in part grouping of the common part and the device specific part. Grouping may include at least in part, grouping a cyclic redundancy check (CRC) with the device specific part. The grouping may include at least in part, grouping a cyclic redundancy check (CRC) with the common part.

In example embodiments of the disclosure, there may be an apparatus. The apparatus may include means for identifying a high efficiency frame in accordance with a high efficiency communication standard sent to one or more devices, the high efficiency frame including at least in part a high efficiency signal field. The apparatus may include means for identifying one or more codewords associated with the high efficiency frame. The apparatus may include means for determining a common part included in a first codeword. The apparatus may include means for determining a device specific part associated with a device included in the first codeword. The apparatus may include means for decoding the high efficiency signal field based at least in part on the common part and the device specific part.

Implementations may include one or more of the following features. The common part comprises common information to one or more devices, the one or more devices including the device. The high efficiency signal field is a high efficiency signal B (HE-SIG-B) field. At least one codeword of the one or more codewords includes at least in part grouping of the common part and the device specific part. Grouping includes at least in part, grouping a cyclic redundancy check (CRC) with the device specific part. The grouping includes at least in part, grouping a cyclic redundancy check (CRC) with the common part.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
   at least one memory that stores computer-executable instructions; and
   at least one processor of the one or more processors configured to access the at least one memory, wherein the at least one processor of the one or more processors is configured to execute the computer-executable instructions to:
   determine a high efficiency preamble of a high efficiency frame, in accordance with a high efficiency communication standard, to be sent to one or more devices, the high efficiency preamble comprising a high efficiency signal field;
   determine a common part included in the high efficiency signal field, the common part comprising user information associated with each of the one or more devices;
   determine one or more device specific parts included in the high efficiency signal field, wherein each respective device specific part is associated with a respective device of the one or more devices;
   encode one or more codewords into the high efficiency signal field, the one or more codewords comprising a first codeword and a second codeword, the first codeword comprising the common part and a first device specific part, and the second codeword comprising a second device specific part; and
   cause to send the high efficiency preamble to the one or more devices.

2. The device of claim 1, wherein the high efficiency signal field includes a high efficiency signal B (HE-SIG-B) field.

3. The device of claim 1, wherein the at least one processor is further configured to execute the computer-executable instructions to:
   determine a first cyclic redundancy check (CRC) associated with the first device specific part;
   determine a second CRC associated with the second device specific part;
   determine a third CRC associated with the common part;
   encode the first CRC and the third CRC into the first codeword; and
   encode the second CRC into the second codeword.

4. The device of claim 1, wherein the instructions to encode the high efficiency signal field further includes computer-executable instructions to:
   determine a CRC associated with the common part and the first device specific part; and
   encode the CRC into the first codeword.

5. The device of claim 1, wherein the instructions to encode the high efficiency signal field further includes computer-executable instructions to:
   determine a CRC associated with the common part, the first device specific part, and a third device specific part;
   and
   encode the common part, the first device specific part, the second device specific part, and the CRC into the first codeword.

6. The device of claim 1, further comprising a transceiver configured to transmit and receive wireless signals.

7. The device of claim 6, further comprising an antenna coupled to the transceiver.

8. The device of claim 1, the common part further comprising an indication of a total number of the one or more devices associated with the high efficiency frame.

9. The device of claim 1, wherein the high efficiency signal field is a first high efficiency signal field of the high efficiency preamble, and wherein the at least one processor is further configured to execute the computer-executable instructions to determine a second high efficiency signal field of the high efficiency preamble, the second high efficiency signal field preceding the first high efficiency signal field and comprising an indication of a total number of the one or more devices associated with the high efficiency frame.

10. A non-transitory computer-readable medium storing computer-executable instructions which, when executed by a processor, cause the processor to perform operations comprising:
- identifying, at a first device, a high efficiency frame in accordance with a high efficiency communication standard, wherein the high efficiency frame was received from a second device and was sent to one or more devices comprising the first device, and wherein the high efficiency frame comprises a high efficiency signal field;
- identifying one or more codewords associated with the high efficiency frame, the one or more codewords comprising a first codeword and a second codeword, the first codeword comprising a common part and a first device specific part, the second codeword comprising a second device specific part, wherein the common part comprises user information associated with each of the one or more devices, and wherein each device specific part is associated with a respective device of the one or more devices;
- and
- decoding the high efficiency signal field based at least in part on the common part the first device specific part, and the second device specific part.

11. The non-transitory computer-readable medium of claim 10, wherein the high efficiency signal field is a high efficiency signal B (HE-SIG-B) field.

12. The non-transitory computer-readable medium of claim 10, the operations further comprising decoding a cyclic redundancy check (CRC) associated with the first device specific part.

13. The non-transitory computer-readable medium of claim 10, the operations further comprising decoding a cyclic redundancy check (CRC) associated with the common part.

14. The non-transitory computer-readable medium of claim 10, wherein the common part further comprises an indication of a total number of the one or more devices associated with the high efficiency frame.

15. The non-transitory computer-readable medium of claim 10, wherein the high efficiency signal field is a first high efficiency signal field of a high efficiency preamble, the operations further comprising determining a second high efficiency signal field of the high efficiency preamble, the second high efficiency signal field preceding the first high efficiency signal field and comprising an indication of a total number of the one or more devices associated with the high efficiency frame.

16. A method comprising:
- determining, by one or more processors of a device, a high efficiency preamble of a high efficiency frame, in accordance with a high efficiency communication standard, to be sent to one or more devices, the high efficiency preamble comprising a high efficiency signal field;
- determining a common part included in the high efficiency signal field, the common part comprising user information associated with each of the one or more devices;
- determining one or more device specific parts included in the high efficiency signal field, wherein each respective device specific part is associated with a respective device of the one or more devices;
- encode one or more codewords into the high efficiency signal field, the one or more codewords comprising a first codeword and a second codeword, the first codeword comprising the common part and a first device specific part, and the second codeword comprising a second device specific part; and
- cause to send the high efficiency preamble to the one or more devices.

17. The method of claim 16, the common part further comprising an indication of a total number of the one or more devices associated with the high efficiency frame.

18. The method of claim 16, wherein the high efficiency signal field is a first high efficiency signal field of the high efficiency preamble, the method further comprising determining a second high efficiency signal field of the high efficiency preamble, the second high efficiency signal field preceding the first high efficiency signal field and comprising an indication of a total number of the one or more devices associated with the high efficiency frame.

19. The method of claim 16, wherein the high efficiency signal field includes a high efficiency signal B (HE-SIG-B) field.

20. The method of claim 16, further comprising:
- determining a first cyclic redundancy check (CRC) associated with the first device specific part;
- determining a second CRC associated with the second device specific part;
- determining a third CRC associated with the common part;
- encoding the first CRC and the third CRC into the first codeword; and
- encoding the second CRC into the second codeword.

* * * * *